US012730794B2

(12) United States Patent
Fuller et al.

(10) Patent No.: US 12,730,794 B2
(45) **Date of Patent: *Sep. 8, 2026**

(54) REAL-TIME TRANSACTIONALLY CONSISTENT CHANGE NOTIFICATIONS

(71) Applicant: Google LLC, Mountain View, CA (US)

(72) Inventors: Alfred Fuller, San Carlos, CA (US); Vijay Kumar, Sunnyvale, CA (US); Rainer Hessmer, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 19/049,084

(22) Filed: Feb. 10, 2025

(65) Prior Publication Data

US 2025/0190420 A1 Jun. 12, 2025

Related U.S. Application Data

(63) Continuation of application No. 17/663,685, filed on May 17, 2022, now Pat. No. 12,235,824, which is a (Continued)

(51) Int. Cl.

*G06F 16/23* (2019.01)
*G06F 9/46* (2006.01)
*G06F 16/27* (2019.01)

(52) U.S. Cl.

CPC .......... *G06F 16/2358* (2019.01); *G06F 9/466* (2013.01); *G06F 16/2379* (2019.01); *G06F 16/273* (2019.01)

(58) Field of Classification Search

CPC ............... G06F 16/2358; G06F 16/273; G06F 16/2379; G06F 9/466

(Continued)

(56) References Cited

U.S. PATENT DOCUMENTS 5,819,066 A * 10/1998 Bromberg ........... G06F 11/3428 706/920
6,925,476 B1 8/2005 Multer et al.

(Continued)

FOREIGN PATENT DOCUMENTS

CN 102214205 A 10/2011
CN 105339913 A 2/2016

(Continued)

OTHER PUBLICATIONS

Chinese Office Action for the related Application No. 202210197345.5 dated Jan. 19, 2026.

(Continued)

*Primary Examiner* — Cam Linh T Nguyen
(74) *Attorney, Agent, or Firm* — Honigman LLP; Brett A. Krueger

(57) ABSTRACT

A method includes executing an initial instance of a change log process for a distributed system, each instance of the change log process configured to store a transaction history of transactions executed on the distributed system. The method also includes receiving transaction requests for executing corresponding transactions on the distributed system and determining a change log load based on the received transaction requests. The method includes executing at least one subsequent instance of the change log process when the change log load satisfied a threshold load. When multiple instances of the change log process are executing, the method includes ceasing execution of the at least one subsequent instance of the change log process and merging the transaction history of the initial instance of the change log process and the transaction history of the at least one subsequent instance of the change log process.

20 Claims, 8 Drawing Sheets

Related U.S. Application Data continuation of application No. 16/686,411, filed on Nov. 18, 2019, now Pat. No. 11,354,296, which is a continuation of application No. 15/163,832, filed on May 25, 2016, now Pat. No. 10,509,778.

(58) Field of Classification Search
USPC .......................................................... 707/615
See application file for complete search history.

(56) References Cited

U.S. PATENT DOCUMENTS

| | | | |
|---|---|---|---|
| 8,086,650 | B1 | 12/2011 | Milford |
| 8,924,375 | B1 | 12/2014 | Bilsborough |
| 9,110,617 | B2 | 8/2015 | Matsuda et al. |
| 9,164,702 | B1 | 10/2015 | Nesbit et al. |
| 9,904,721 | B1 * | 2/2018 | Holenstein .......... G06F 11/2097 |
| 2004/0220945 | A1 | 11/2004 | Pioli et al. |
| 2006/0218532 | A1 | 9/2006 | Cordella et al. |
| 2007/0136244 | A1 | 6/2007 | MacLaurin et al. |
| 2007/0260931 | A1 | 11/2007 | Aguilar-Macias et al. |
| 2009/0077136 | A1 | 3/2009 | Igawa et al. |
| 2009/0100113 | A1 | 4/2009 | Burghard et al. |
| 2009/0100434 | A1 | 4/2009 | Burghard et al. |
| 2009/0320047 | A1 | 12/2009 | Khan et al. |
| 2010/0039284 | A1 | 2/2010 | Hall et al. |
| 2011/0246434 | A1 | 10/2011 | Cheenath et al. |
| 2011/0251997 | A1 | 10/2011 | Wang et al. |
| 2012/0005152 | A1 | 1/2012 | Westen et al. |
| 2012/0109895 | A1 | 5/2012 | Zwilling et al. |
| 2012/0180103 | A1 | 7/2012 | Weik, III et al. |
| 2013/0042147 | A1 | 2/2013 | Tonouchi |
| 2013/0111502 | A1 | 5/2013 | Carey et al. |
| 2013/0117294 | A1 | 5/2013 | Arao |
| 2014/0164846 | A1 | 6/2014 | Unrein et al. |
| 2014/0189526 | A1 | 7/2014 | Chen et al. |
| 2014/0195492 | A1 | 7/2014 | Wilding |
| 2015/0347923 | A1 | 12/2015 | Bartley et al. |
| 2016/0149941 | A1 | 5/2016 | Thakur et al. |
| 2016/0173599 | A1 | 6/2016 | Chablani et al. |
| 2017/0034083 | A1 | 2/2017 | Deutsch |

FOREIGN PATENT DOCUMENTS

| | | |
|---|---|---|
| WO | 2015200686 | 12/2015 |
| WO | 2015200686 A1 | 12/2015 |

OTHER PUBLICATIONS

International Search Report and Written Opinion for the related PCT Application No. PCT/US2017/029888 dated Aug. 2, 2017.

European Search Report for the related EP application 22180944.5 dated Dec. 19, 2022.

* cited by examiner

REAL-TIME TRANSACTIONALLY CONSISTENT CHANGE NOTIFICATIONS

CROSS REFERENCE TO RELATED APPLICATIONS

This U.S. patent application is a continuation of, and claims priority under 35 U.S.C. § 120 from, U.S. patent application Ser. No. 17/663,685, filed on May 17, 2022, which is a continuation of U.S. patent application Ser. No. 16/686,411, now U.S. Pat. No. 11,354,296, filed on Nov. 18, 2019, which is a continuation of U.S. patent application Ser. No. 15/163,832, now U.S. Pat. No. 10,509,778, filed on May 25, 2016. The disclosures of these prior applications are considered part of the disclosure of this application and are hereby incorporated by reference in their entireties.

TECHNICAL FIELD

This disclosure relates to providing one or more watchers consistent change notifications for data that the watchers subscribe to within a distributed system.

BACKGROUND

Distributed storage systems store data within a datastore on memory hardware overlaying one or more memory locations. Watchers may issue standing queries to subscribe to particular pieces of data stored on the distributed system and receive change notifications anytime the subscribing data undergoes a mutation. For instance, a writer may execute write transactions to modify/mutate particular pieces of data stored on the distributed system and watchers subscribing to the data are notified when the data is modified. However, increases in demand on the distributed system, when multiple changes/writes occur simultaneously, result in the distributed system being overrun and unable to stream change notifications in real-time. It is known to drop subscriptions completely to alleviate the load on the distributed system during periods of high demand. For this reason some systems are designed without guarantees of in order delivery and often times ordering is left to the client. However, this results in subscribing watchers receiving inconsistent snapshots of the distributed data. Moreover, it is known to use a change log to record each transaction to the data stored on the distributed system. These change logs record every change made to a datastore, and when a read transaction occurs on the datastore, the change log functions as an on/off check point for all the data for a given snapshot.

SUMMARY

Employing durable change logs on distributed systems generally require that the change logs be truncated onto a single machine every so often, thereby resulting in bottle necking while transactions wait to execute. Thus, durable change logs negate the distributed functionality afforded by the distributed system due to their inherent scalability limitations during periods of high demand on the distributed system. One aspect of the disclosure provides a method for creating transactionally consistent change notifications. The method includes: executing, by data processing hardware, an initial instance of a change log process for a distributed system, receiving, at the data processing hardware, transaction requests for executing corresponding transactions on the distributed system; and determining, by the data processing hardware, a change log load based on the received transaction requests. Each instance of the change log process is configured to store, on memory hardware in communication with the data processing hardware, a transaction history of transactions executed on the distributed system. When the change log load satisfies a threshold load, the method includes executing, by the data processing hardware, at least one subsequent instance of the change log process. The method further includes determining, by the data processing hardware, whether multiple instances of the change log process are executing. When multiple instances of the change log process are executing, the method includes ceasing, by the data processing hardware, execution of the at least one subsequent instance of the change log process and merging, by the data processing hardware, the transaction history of the initial instance of a change log process and the transaction history of the at least one subsequent instance of the change log process.

Implementations of the disclosure may include one or more of the following optional features. In some implementations, the method includes storing each transaction history in a change log cache of the memory hardware. Storing each transaction history may include: sharding, by the data processing hardware, the transaction history into data stripes; replicating each data stripe; and storing the data stripes and the replicated data stripes at multiple storage locations of the memory hardware. When the change log load dissatisfies the threshold load after executing the at least one subsequent instance of the change log process, the method may include ceasing, by the data processing hardware, execution of the at least one subsequent instance of the change log process, and merging, by the data processing hardware, the transaction history of the initial instance of the change log process and the transaction history of the at least one subsequent instance of the change log process.

In response to receiving each transaction request, the method may include: obtaining, by the data processing hardware, a true time; determining, by the data processing hardware, a maximum commit time based on the true time; and communicating the maximum commit time from the data processing hardware to at least one change log cache of the memory hardware. The maximum commit time may specify a maximum time to complete execution of the corresponding transaction on the distributed system.

In some examples, the at least one change log cache sets a notification lock from the true time until the maximum commit time. The notification lock may prevent the corresponding change log cache from notifying one or more subscribing watchers for completed transactions having corresponding commit times earlier than the maximum commit time. The at least one change log cache may remove the notification lock at an end of the maximum commit time. The removed notification lock may permit the corresponding log cache to notify the one or more subscribing watchers for each completed transaction having the corresponding commit time earlier than the maximum commit time. After communicating the maximum commit time, the method may include committing, by the data processing hardware, execution of the corresponding transaction on the distributed system. Here, the transaction includes the maximum commit time. Thereafter, the method may also include obtaining, by the data processing hardware, a transaction result indicating execution of the corresponding transaction on the distributed system is accepted when the corresponding transaction includes a respective commit time at or before the maximum commit time, and communicating the transaction result from the data processing hardware to the at least one change log cache.

In some examples, the received transaction result causes the at least one change log cache to record at least one mutation associated with the corresponding transaction. The at least one change log cache may communicate the recorded mutation to one or more watcher proxies executing on the data processing hardware. Each watcher proxy may be configured to provide a notification to a respective subscribing watcher of the corresponding transaction. The notification may include the recorded mutation and optionally include a consistent snapshot of the transaction history. Here, the consistent snapshot in the notification includes the corresponding transaction and any completed transactions having corresponding commit times earlier than the commit time of the corresponding transaction.

In some implementations, after communicating the maximum commit time, the method includes committing, by the data processing hardware, execution of the corresponding transaction on the distributed system. Here, the transaction includes the maximum commit time. Thereafter, the method may include obtaining, by the data processing hardware, a transaction result indicating execution of the corresponding transaction on the distributed system is rejected when the corresponding transaction fails to commit at or before the maximum commit time, and communicating the transaction result from the data processing hardware to the at least one change log cache. In some examples, the received transaction result causes the at least one change log cache to create a gap in the transaction history between the true time when the transaction process communicated the maximum commit time to the at least one change log cache and the maximum commit time.

In some examples, the at least one change log cache communicates the gap in the transaction history to one or more watcher proxies executing on the data processing hardware. Each watcher proxy may be configured to provide a notification to a respective subscribing watcher of the corresponding transaction at an end of the maximum commit time, the notification including a cache miss during the gap in the transaction history.

The method may also include determining, by the data processing hardware, a restart of the change log process after an off-line event, and obtaining, at the change log process executing on the data processing hardware, a true time. The method may also include determining, by the data processing hardware, a current sequence number based on the true time when the change log process restarts, and waiting, by the data processing hardware, a global max commit time delay from the current sequence number before updating the transaction history for any transactions executed on the distributed system. Transactions executing on the distributed system prior to the restart of the change log process may complete within the global max commit time delay. The method may also include transmitting the merged transaction history to one or more subscribing watchers. Each subscribing watcher may have a standing query for changes to data stored on the memory hardware.

Another aspect of the disclosure provides a system for creating transactionally consistent change notifications. The system includes data processing hardware of a distributed system and memory hardware in communication with the data processing hardware. The memory hardware stores instructions that when executed on the data processing hardware cause the data processing hardware to perform operations. The operations include: executing an initial instance of a change log process for a distributed system; receiving transaction requests for executing corresponding transactions on the distributed system; and determining a change log load based on the received transaction requests. Each instance of the change log process is configured to store, on the memory hardware, a transaction history of transactions executed on the distributed system. When the change log load satisfies a threshold load, the system includes executing at least one subsequent instance of the change log process and determining whether multiple instances of the change log process are executing. When multiple instances of the change log process are executing, the system includes ceasing execution of the at least one subsequent instance of the change log process and merging the transaction history of the initial instance of a change log process and the transaction history of the at least one subsequent instance of the change log process.

This aspect may include one or more of the following optional features. In some implementations, the operations further include storing each transaction history in a change log cache of the memory hardware. Storing each transaction history may include: sharding the transaction history into data stripes; replicating each data stripe; and storing the data stripes and the replicated data stripes at multiple storage locations of the memory hardware. The operations may further include, when the change log load dissatisfies the threshold load after executing the at least one subsequent instance of the change log process, ceasing execution of the at least one subsequent instance of the change log process, and merging the transaction history of the initial instance of the change log process and the transaction history of the at least one subsequent instance of the change log process. In response to receiving each transaction request, the operations may include: obtaining a true time; determining a maximum commit time based on the true time; and communicating the maximum commit time to at least one change log cache of the memory hardware. The maximum commit time may specify a maximum time to complete execution of the corresponding transaction on the distributed system.

The at least one change log cache may set a notification lock from the true time until the maximum commit time. The notification lock may prevent the corresponding change log cache from notifying one or more subscribing watchers for completed transactions having corresponding commit times earlier than the maximum commit time. The at least one change log cache may remove the notification lock at an end of the maximum commit time. The removed notification lock may permit the corresponding change log cache to notify the one or more subscribing watchers for each completed transaction having the corresponding commit time earlier than the maximum commit time.

In some examples, the operations include, after communicating the maximum commit time, committing execution of the corresponding transaction on the distributed system. The transaction includes the corresponding commit time. Thereafter, the operations include obtaining a transaction result indicating execution of the corresponding transaction on the distributed system is accepted when the corresponding transaction includes a respective commit time at or before the maximum commit time, and communicating the transaction result to the at least one change log cache. The received transaction result may cause the at least one change log cache to record at least one mutation associated with the corresponding transaction. The at least one change log cache may communicate the recorded mutation to one or more watcher proxies executing on the data processing hardware. Each watcher proxy may be configured to provide a notification to a respective subscribing watcher of the corresponding transaction, the notification including the recorded mutation. The notification may further include a consistent snapshot of the transaction history. The consistent snapshot may include the corresponding transaction and any completed transactions having corresponding commit times earlier than the commit time of the corresponding transaction.

In some implementations, the operations include, after communicating the maximum commit time, committing execution of the corresponding transaction on the distributed system. Here, the transaction includes the maximum commit time. Thereafter, the operations may also include obtaining a transaction result indicating execution of the corresponding transaction on the distributed system is rejected when the corresponding transaction fails to commit at or before the maximum commit time, and communicating the transaction result to the at least one change log cache. The received transaction result may cause the at least one change log cache to create a gap in the transaction history between the true time when the transaction process communicated the maximum commit time to the at least one change log cache and the maximum commit time. The at least one change log cache may communicate the gap in the transaction history to one or more watcher proxies executing on the data processing hardware. Each watcher proxy may be configured to provide a notification to a respective subscribing watcher of the corresponding transaction at an end of the maximum commit time, the notification including a cache miss during the gap in the transaction history.

In some examples, the operations further include: determining a restart of the change log process after an off-line event; obtaining a true time; determining a current sequence number based on the true time when the change log process restarts; and waiting a global max commit time delay from the current sequence number before updating the transaction history for any transactions executed on the distributed system. Transactions executing on the distributed system prior to the restart of the change log process may complete within the global max commit time delay. The operations may also include transmitting the merged transaction history to one or more subscribing watchers, each subscribing watcher having a standing query for changes to data stored on the memory hardware.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A distributed system having an in-memory change log, or change log cache, stores a transaction history of transactions executed on the distributed system to process watch subscriptions faster, and thereby provide near "realtime" updates when the transactions execute. Thus, the caching on the memory offers increased scalability due to a single change log cache storing transaction histories for transactions executing across many (e.g., a thousand) machines of the distributed system. Generally, a given datastore on the distributed system is able to process a greater number of transactions per second then the number of tasks the change log cache may execute per second. To alleviate decreases in throughput for the change log cache to handle all transaction requests issued to the datastore at a fan-in point, implementations include dynamically splitting the change log cache into multiple change log caches (e.g. multiple instances of a change log process) executing on different computing resources when demand is high. Thereafter, the multiple change log caches, and their associated transaction histories, may be opportunistically merged together to maintain guarantees or consistencies of the transaction history for one or more subscribing watchers at a fan-out point.

Figure 1:
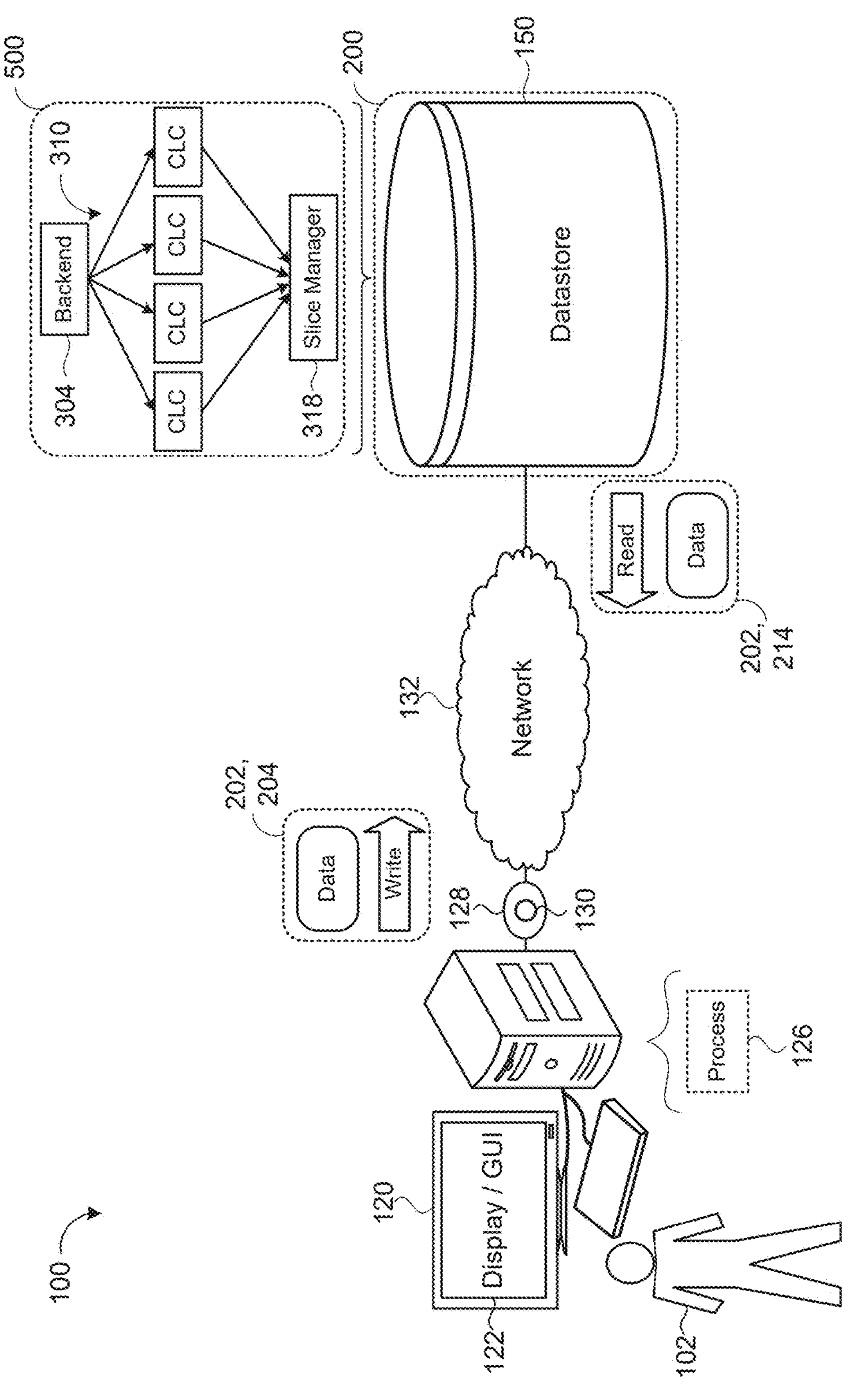
FIG. 1 is a schematic view of an example system for providing a user device access to non-transitory data storage of a distributed system.
Figure 2:
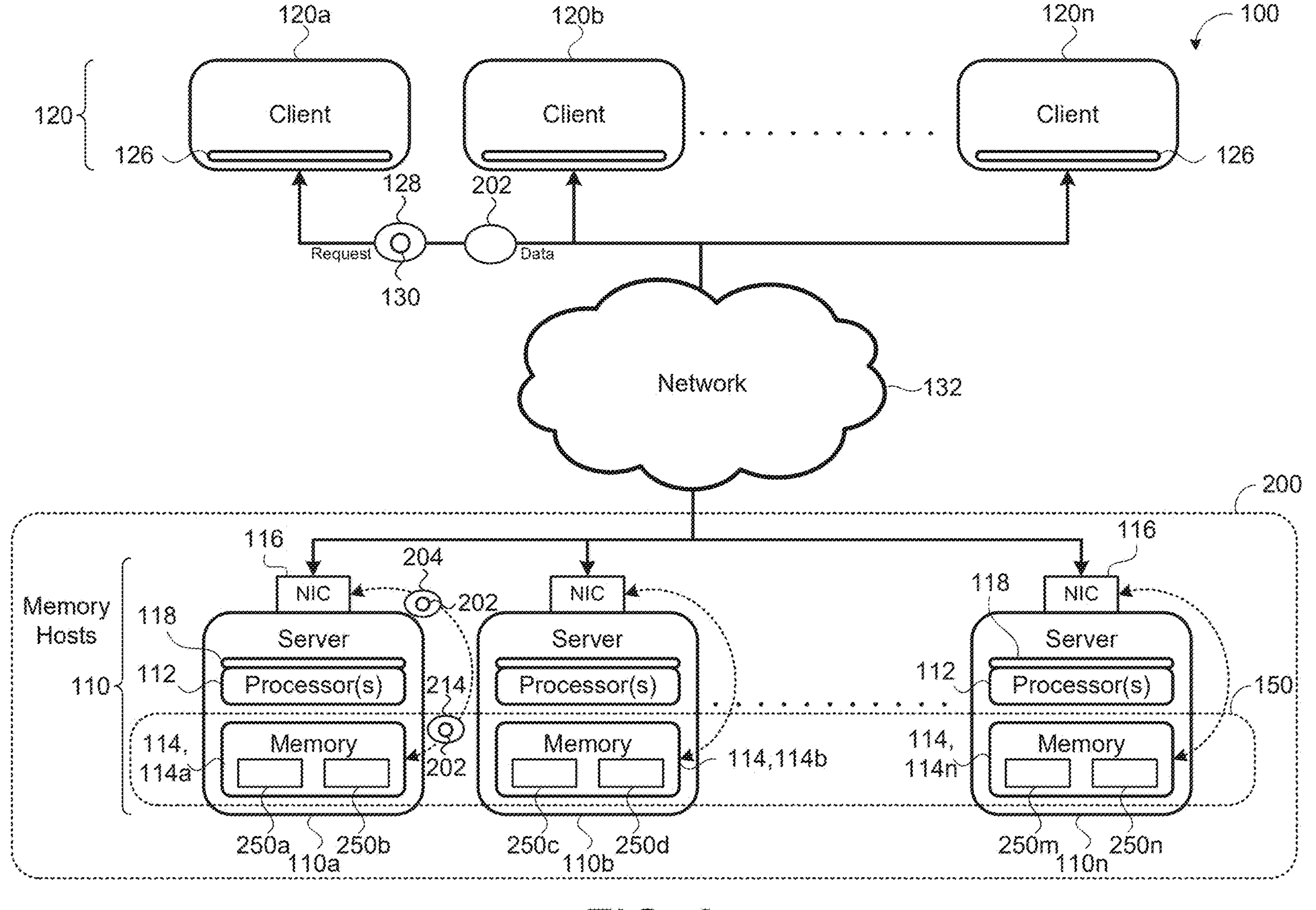
FIG. 2 is a schematic view of an example system for providing one or more user devices access to non-transitory data store of a distributed storage system.

Referring to FIGS. 1 and 2, in some implementations, a system 100 includes one or more user devices 120*a-n* associated with a user 102. The user devices 120 are in communication, via a network 132, with a distributed storage system 200 having a scalable/elastic non-transitory datastore 150. In some implementations, the distributed storage system 200 executes a computing device 112 that manages access to the datastore 150. User devices 120 write data 202 into the datastore 150 when the computing device 112 executes write transactions 204 and watch or read the data 202 from the datastore 150 when the computing device 112 executes read transactions 214. In some examples, the computing device 112 executes write transactions 204 when the computing device 112 receives a write access request 128 from a user device 120 via the network 132. Likewise, the computing device 112 executes read transactions 214 when the computing device 112 receives a read access request 130 from a user device 120 via the network 132. In some examples, the read access request 130 corresponds to a standing query issued once over the distributed system 200 that allows the user device 120 to consistently watch or read the data 202 from the datastore 150 without having to repeatedly issue new read access requests 130.

In some implementations, the distributed storage system 200 executes a change log process 500 for storing a transaction history 312 (FIG. 3) of transactions 204 executed on the distributed system 200 in a non-durable change log cache (CLC) 310. In some scenarios, the distributed storage system 200 executes multiple instances of the change log process 500 during periods of high demand, such as during periods when the number of write access requests 128 the distributed system 200 receives increases, thereby causing a change log load on the distributed system 200 to also increase. In some implementations, a backend 304 executing on the distributed system 200 may fan-in or distribute multiple slices of mutated data 202 from a corresponding transaction 204 among multiple non-durable CLCs 310 in a non-durable state, and then a slice manager 318 executing on the distributed system 200 may fan-out or merge the slices of the mutated data 202 from the multiple CLCs 310 to provide one or more user devices 120 interested in the corresponding transactions a consistent snapshot of the datastore 150.

The user devices 120 can be any computing devices that are capable of communicating with the computing device 112 through the network 132. User devices 120 include, but are not limited to, desktop computing devices and mobile computing devices, such as laptops, tablets, smart phones, and wearable computing devices (e.g., headsets and/or watches). The user devices 120 may further execute a graphical user interface (GUI) 222 on a display 122 to write data 202 to the datastore 150 and/or read data 202 from the datastore 150 of the distributed storage system 200. The user devices 120 may include both writers 320 (FIG. 3) transmitting write access requests 128 to update/change/mutate data 202 stored in the datastore 150 and also readers 322 (FIG. 3) transmitting read access requests 130 (e.g., a standing query) to get the data 202 any time a change or mutation to the data 202 occurs.

The network 132 may include various types of networks, such as local area network (LAN), wide area network (WAN), and/or the Internet. Although the network 132 may represent a long range network (e.g., Internet or WAN), in some implementations, the network 132 includes a shorter range network, such as a local area network (LAN). In some implementations, the network 132 uses standard communications technologies and/or protocols. Thus, the network 132 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, Bluetooth, Bluetooth Low Energy (BLE), etc. Similarly, the networking protocols used on the network 132 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 132 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 132 uses custom and/or dedicated data communications technologies instead of, or in addition to, the ones described above.

Referring to FIG. 2, in some implementations, the distributed storage system 200 includes loosely coupled memory hosts 110, 110*a-n* (e.g., computers or servers), each having a computing resource 112 (e.g., one or more processors or central processing units (CPUs)) in communication with storage resources 114 (e.g., memory hardware, memory hardware, flash memory, dynamic random access memory (DRAM), phase change memory (PCM), and/or disks) that may be used for caching data. The datastore 150 (e.g., a storage abstraction) overlain on the storage resources 114 allows scalable use of the storage resources 114 by one or more user devices 120, 120*a-n*. The user devices 120 may communicate with the memory hosts 110 through the network 132 (e.g., via remote procedure calls (RPC)).

In some implementations, the distributed storage system 200 is "single-sided," eliminating the need for any server jobs for responding to RPC from user devices 120 to write data 202 when executing the write transaction 204 or read data 202 when executing the read transaction 214 on their corresponding memory hosts 110 and may rely on specialized hardware to process remote write and read access requests 128, 130, respectively, instead. "Single-sided" refers to the method by which most of the request processing on the memory hosts 110 may be done in hardware rather than by software executed on CPUs 112 of the memory hosts 110. Rather than having a processor 112 of a memory host 110 (e.g., a server) execute a server process 118 that exports access of the corresponding storage resource 114 (e.g., non-transitory memory) to user processes 126 executing on the user devices 120, the user devices 120 may directly access the storage resource 114 through a network interface controller (NIC) 116 of the memory host 110. Additional concepts and features related to a single-sided distributed caching system can be found in U.S. Pat. No. 9,164,702, which is hereby incorporated by reference in its entirety.

The distributed storage system 200 may put data 202 in memory hardware 114 of the remote memory hosts 110 (e.g., the datastore 150) and get the data 202 from the remote memory hosts 110 via RPCs or via remote direct memory access (RDMA)-capable network interface controllers (NIC) 116. A network interface controller 116 (also known as a network interface card, network adapter, or LAN adapter) may be a computer hardware component that connects a computing device/resource 112 to the network 132. Both the memory hosts 110*a-n* and the user device 120 may each have a network interface controller 116 for network communications. A host process 118 executing on the computing processor 112 of the memory host 110 may allocate a memory location 250*a-n* when executing a write transaction 204 to write updated data 202.

In some implementations, one or more user devices 120 (e.g., watcher(s) 322) issue read access requests 130 associated with a standing query once over the distributed system 200 to subscribe to a particular piece of data 202. The standing query (e.g. read access request 130) allows the corresponding user device 120 (e.g., subscribing watcher 322) to consistently watch or read the data 202 from the datastore 150 without having to repeatedly issue new read access requests 130. Accordingly, anytime the distributed system 200 receives a write access request 138 to execute a write transaction 204 on the distributed system 200 for modifying data 202 in the datastore 150, the distributed system 200 streams the modified/mutated data 202 to the one or more watchers 322 that subscribe to the data 202.

In some implementations, the distributed system 200 streams updated data 202 to one or more subscribing watchers 322 in real-time and is scalable based upon a number of transaction requests 138 and 140 the distributed system 200 is currently receiving at a given point in time. For instance, the distributed system 200 may provide a consistent snapshot (e.g., transaction history 312) at a given instance in time that collapses multiple mutations to the data 202 in the datastore 150 at times when the distributed system 200 is under a high load, i.e., the distributed system 200 is receiving a high number of write requests 138. This scalability allows the distributed system 200 to stream updated data 202 to subscribing watchers 322 in as close to real-time as possible, and without having to drop streaming the data 202 to watchers 322 due to overloading of the distributed system 200. Accordingly, when execution of a write transaction 204 successfully completes, read transactions 214 by the watchers 322 reflect a current, consistent state of the datastore 150 so that the watchers 322 receive a most recent copy of the data 202 modified by the write transaction 204. The watchers 322 receive a single consistent snapshot of the data at a given instance in time that may not reflect every change that occurred since a last snapshot.

Figure 3:
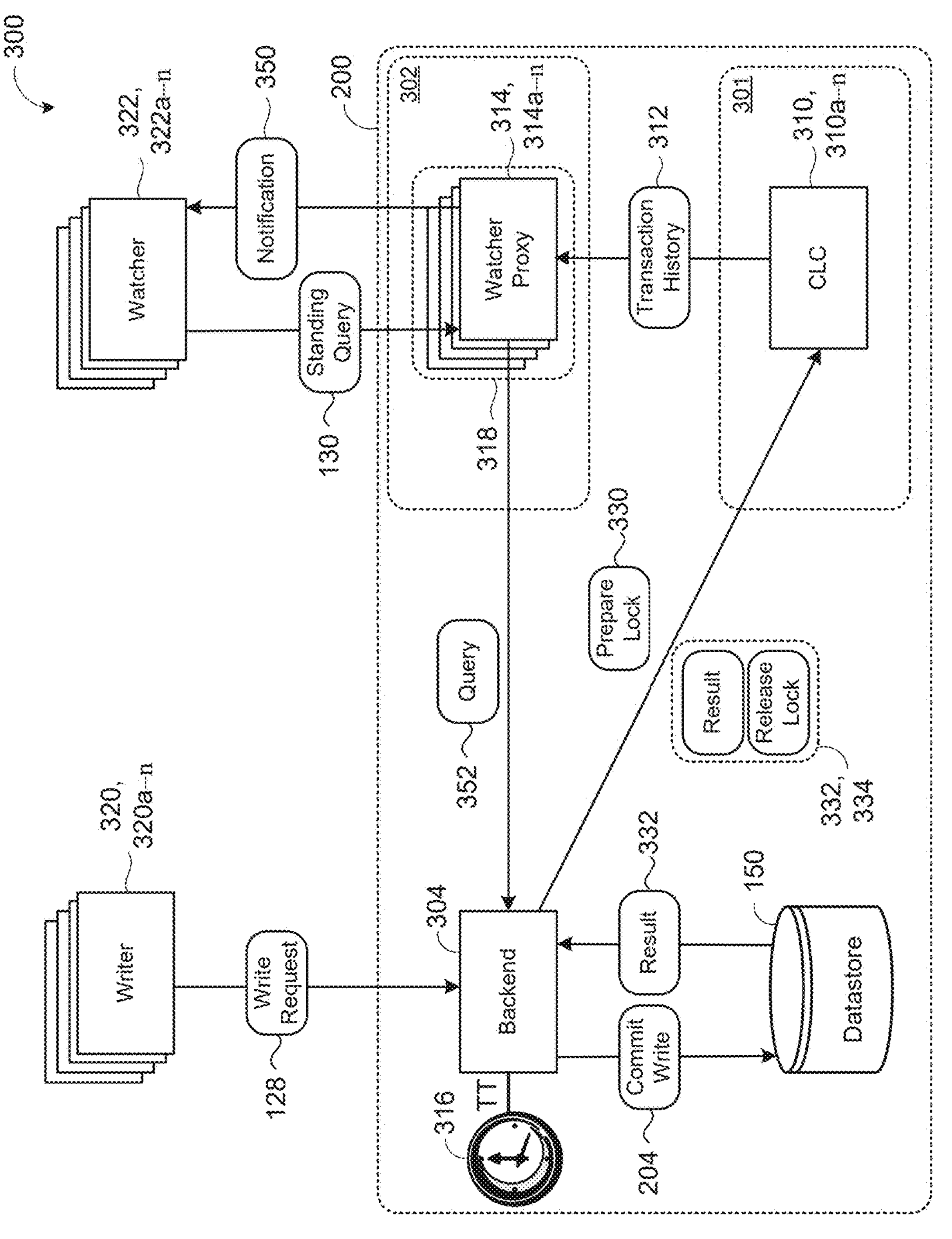
FIG. 3 is a schematic view of example components of a notification system for providing near real-time notifications for standing queries.

FIG. 3 is a block diagram of an example implementation of components of a notification system 300 for transmitting notifications 350 to one or more watchers 322 that subscribe to data 202 stored in the datastore 150. As used herein, a watcher 322 may subscribe to specified data 202 by issuing a standing query (e.g., read access request 130) so that changes to the specified data 202 in the datastore 150 stream as notifications 350 in near real-time to the watchers 322. The notification system 300 includes the distributed system 200 in communication via the network 132 with remote user devices 120 associated with one or more remote writers 320, 320*a-n* and one or more remote watchers 322, 322*a-n*. The distributed system 200 includes the datastore backend 304 and the slice manager 318 executing on the computing device 112 and the datastore 150 of the memory hardware 114.

In some implementations, the computing device 112 executes instructions for the change log process 500, which provides a non-durable change log cache (CLC) 310 within the memory 114 for storing portions of a transaction history 312 of transactions 204 executed on the distributed system 200 in a non-durable state. By contrast to using durable change logs that record every change made to data 202 within the datastore 150, the CLC 310 is shardable within the memory 114 to allow the computing device 112 to scale the CLC 310 up or down by executing additional instances of the change log process to provide two or more CLC's 310*a-n*. In this way, the change log process 500 may also cease execution of the one or more instances depending upon a current load on the distributed system 200 at a given time. Without the scalability offered by the non-durable CLC(s) 310, a higher number of write requests 128 would result in bottlenecking while each write transaction 204 waits to execute at the corresponding location within the datastore 150. Generally, a single datastore 150 is assigned a respective CLC 310 for recording changes to that datastore 150. However, multiple datastores 150 may be assigned to the same CLC 310. For instance, the notification system 300 could include one-million datastores 150 and one-hundred CLCs 310 such that each CLC 310 would record changes for one-thousand datastores 150. In some examples, it is necessary to scale up more CLCs 310 when additional datastores 150 are added to handle increases in load on the distributed system 200.

In some examples, the computing device 112 (e.g. data processing hardware) executes one or more watcher proxies 314, 314*a-n*, each including a stateful machine for monitoring individual subscriptions of the watchers 322. For instance, each watcher 322 has a one-to-one connection with a respective watcher proxy 314. Accordingly, each watcher proxy 314 multiplexes between a respective watcher 322 and one or more CLC's 310 that provide mutations or cache misses to the corresponding watcher proxy 314. In scenarios when a cache miss occurs, the watcher proxy 314 may query 352 a backend 700 to retrieve/get data 202 from the datastore 202.

In some implementations, the backend 304 executes a transaction process for updating the transaction history 312 stored in the CLC(s) 310 each time a new write transaction 204 commits to update data 202 within the datastore 150. The transaction process may employ the CLC 310 during a fan-in stage 301 to maintain a cache of an ordered change log (e.g., transaction history 312). In some examples, the transaction process shards the cache of the ordered change log maintained by the CLC 310 into stripes of data 202, replicates each stripe of data 202, and stores the data stripes and the replicated data stripes at multiple storage locations 250 on the memory hardware 114. The backend 304 may obtain a true time (TT) from a true time clock 316 and determine a maximum commit time $TD_{Max}$ based on the TT when the backend 310 receives a write access request 128 from a remote writer 320. The $TD_{Max}$ specifies a maximum time to commit execution of the corresponding write transaction 204 on the distributed system 200. For instance, the $TD_{Max}$ enforces an upper bound time limit for the distributed system 200 to commit the corresponding transaction 204, whereby the distributed system 200 aborts the corresponding transaction 204 if the distributed system 200 is unable to commit the transaction 204 by the $TD_{Max}$.

Figure 6:
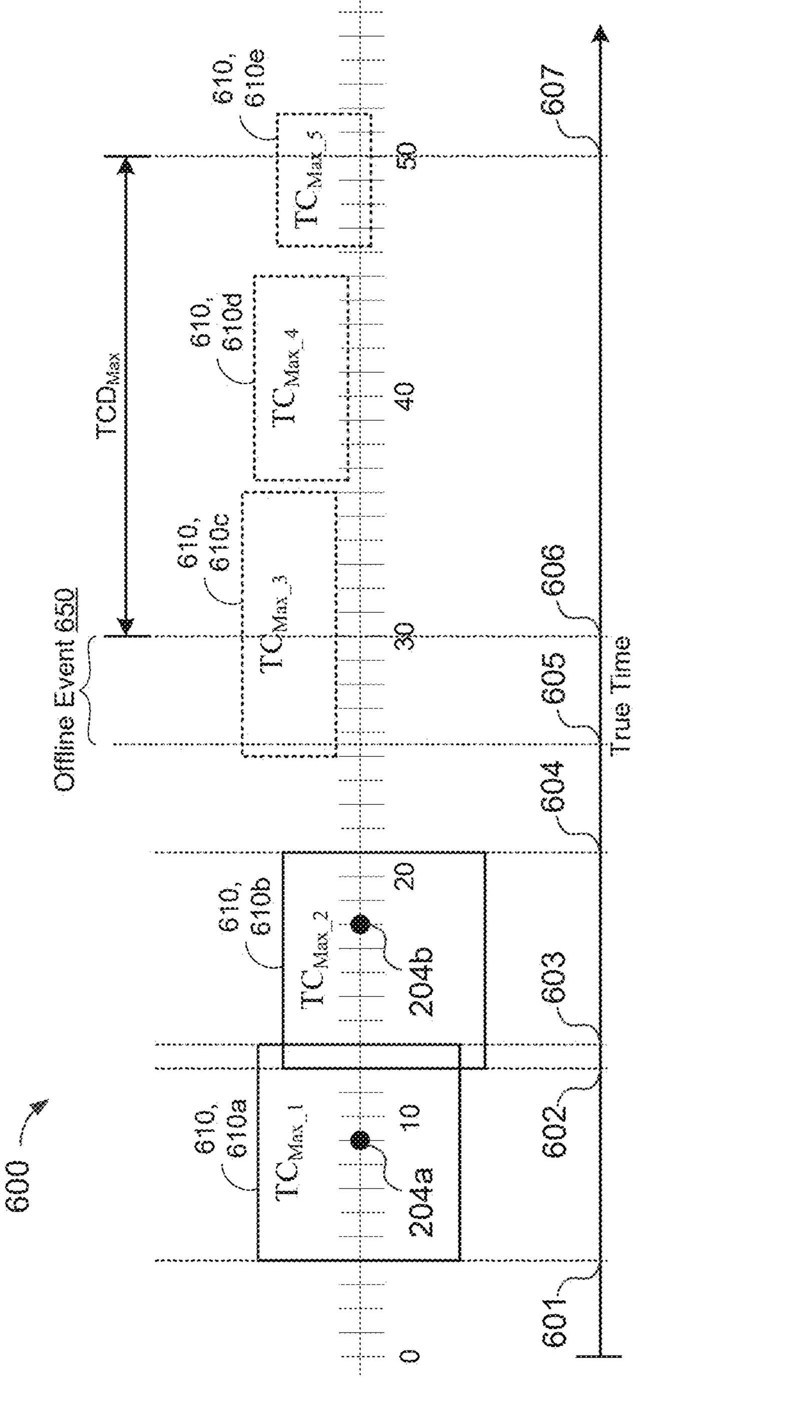
FIG. 6 shows a plot of commit time windows set by a change log process executing on a distributed system

In some examples, during the fan-in stage 301, the backend 304 sends a prepare lock message 330 to the CLC 310 before executing the write transaction 204 (e.g. commit write) to modify/mutate/change data 202 within the datastore 150. The prepare lock message 330 includes the $TD_{Max}$ for the corresponding pending transaction 204 and causes the CLC 310 to set a notification lock during a commit time window 610 (FIG. 6). Here, the commit time window 610 corresponds to a window of time from the TT when the CLC 310 receives the prepare lock message 330 to the $TD_{Max}$. The notification lock prevents the CLC 310 from notifying one or more watchers 322 during the commit time window 610 for any completed transactions 204 having corresponding commit times earlier than the $TD_{Max}$ and later than the start of the pending transaction. As used herein, the term "commit time" refers to a time when execution of a corresponding write transaction 204 completes. After sending the prepare lock message 330 to the CLC 310, the backend 304 commits execution of the write transaction 204 to update the data 202 within the datastore 150.

In some implementations, the backend 304 obtains a transaction result 332 after the corresponding transaction 204 commits and provides the transaction result 332 to the CLC 310. In some examples, the transaction result 332 indicates execution of the corresponding transaction 204 is accepted when the corresponding transaction 204 includes a commit time at or before the $TD_{Max}$. In these examples, the transaction result 332 may also include at least one mutation of the data 202 resulting from the corresponding transaction 204. In other examples, the transaction result 332 indicates execution of the corresponding transaction 204 is rejected when the corresponding transaction 204 fails or the datastore 150 is otherwise unable to complete/commit the corresponding transaction by the $TD_{Max}$. Accordingly, as used herein, a transaction result 332 indicating a transaction 204 is "rejected" may refer to a transaction 204 that has officially aborted before the $TD_{Max}$, and thus the outcome is known, or may refer to a transaction 204 for which the outcome of whether or not the transaction 204 completed is unknown since the transaction 204 did not commit by the $TD_{Max}$.

The backend 304 may provide a release lock message 334 to the CLC 310 after committing the write transaction 204. The release lock message 334 includes the transaction result 332 for the corresponding transaction 204 and causes the CLC 310 to release/remove the notification lock. For instance, the CLC 310 may immediately remove the notification lock upon receiving the release lock message 334. In implementations when the transaction result 332 indicates the corresponding transaction is accepted, the release lock message 334 causes the CLC 310 to record the at least one mutation of the data 202 associated with the corresponding transaction 204. Conversely, the release lock message 334 causes the CLC 310 to create a gap in the transaction history 312 during the commit time window 610 for the corresponding transaction 204. The gap created by the CLC 310 indicates that a transaction 204 was pending during the gap but the outcome of whether or not the transaction 204 fully committed is unknown.

In some implementations, the one or more watcher proxies 314 execute during a fan-out stage 302 of the transaction process to receive the transaction history 312 from the CLC 310. The transaction history 312 includes any transactions 204 executed on the distributed system 200 having corresponding commit times earlier than the oldest prepare lock message for the corresponding transaction 204. In some examples, the CLC 310 communicates the at least one mutation of the data 202 when the corresponding transaction 204 is accepted by recording the mutation of the data 202 in the transaction history 312 and providing the transaction history 312 to the watcher proxies 314. In these examples, each watcher proxy 314 includes the mutation of the data 202 in a notification 350 and provides the notification 350 to a respective subscribing watcher 322. In other examples, the CLC 310 provides the transaction history 312 having the gap to the watcher proxies 314 when the corresponding transaction 204 is rejected, thereby causing each watcher proxy 314 to push a cache miss in a notification 350 and provide the notification 350 to a respective subscribing watcher 322. Here, the cache miss reflects an unknown outcome of a transaction 204 pending during the gap in the transaction history 312. In some examples, the watcher proxies 314 query 352 the backend 304 to obtain a snapshot of the datastore 150 during the gap in the transaction history 312 to determine the outcome of the pending transaction 204 and provide that outcome to the respective subscribing watcher 322. Conversely, when the corresponding transaction 204 is rejected due to officially aborting before $TD_{Max}$, then the corresponding transaction 204 is simply omitted from the transaction history 312. Moreover, when a new watcher 322 connects to the distributed system 200, a corresponding watcher proxy 314 may consolidate all changes in the datastore 150 that affect the standing query 130 associated with the watcher 322 to that the watcher 322 receives a consistent snapshot of the datastore 150.

Mutations of data 204 may be split into slices among multiple CLCs 310 in situations when a single CLC 310 does not have sufficient throughput to record all the mutations when the number of transactions 204 committed to the datastore 150 increases. In some implementations, the slice manager 318 merges the transaction histories 312 from the multiple CLCs 310 that each include one or more respective slices of the mutated data 204 to satisfy a given standing query (e.g., read access request 130) from one or more watchers 322.

Figure 4A:
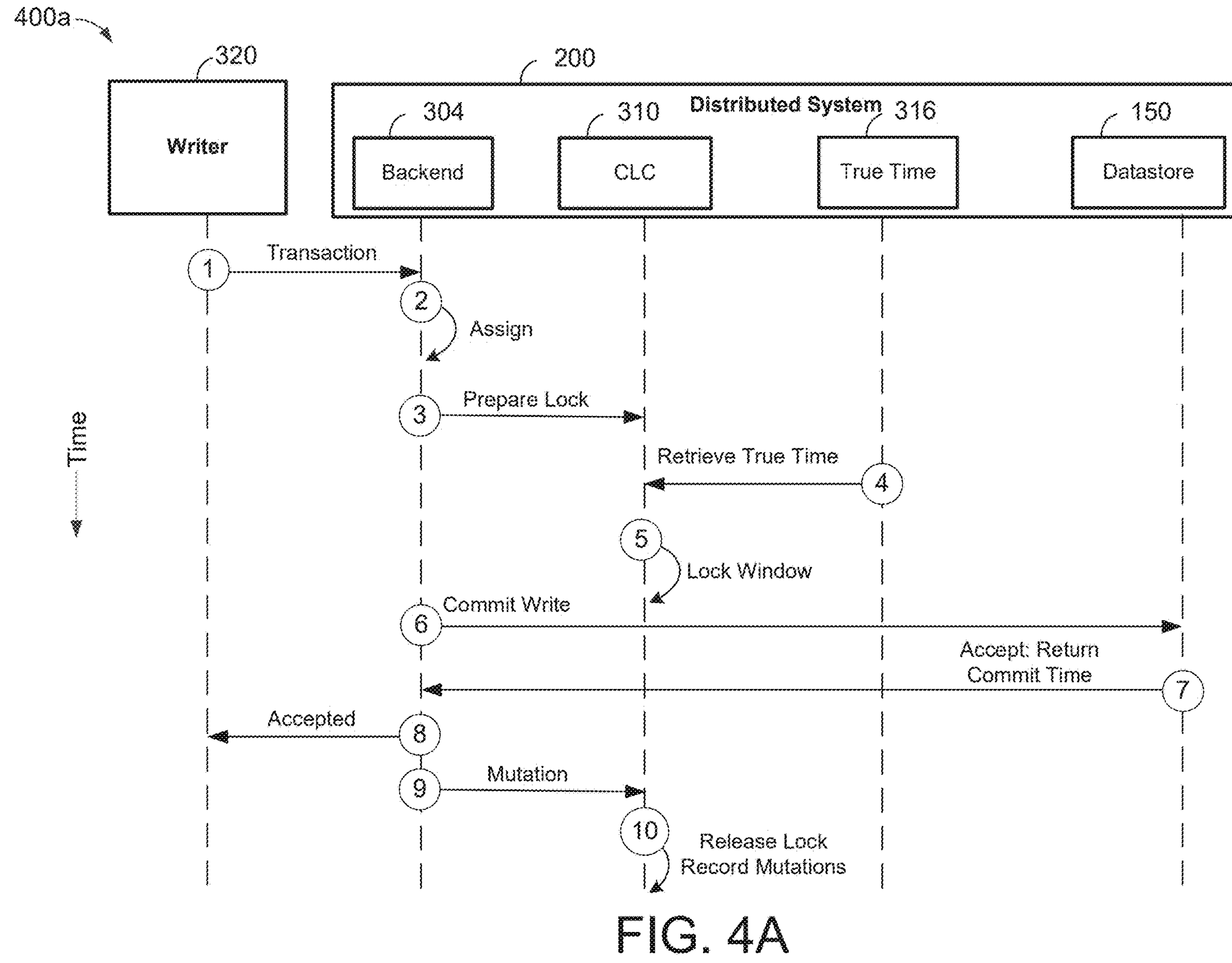
FIGS. 4A and 4B show schematic views of example operations performed by a backend and at least one change log cache of the notification system of FIG. 3.
Figure 4B:
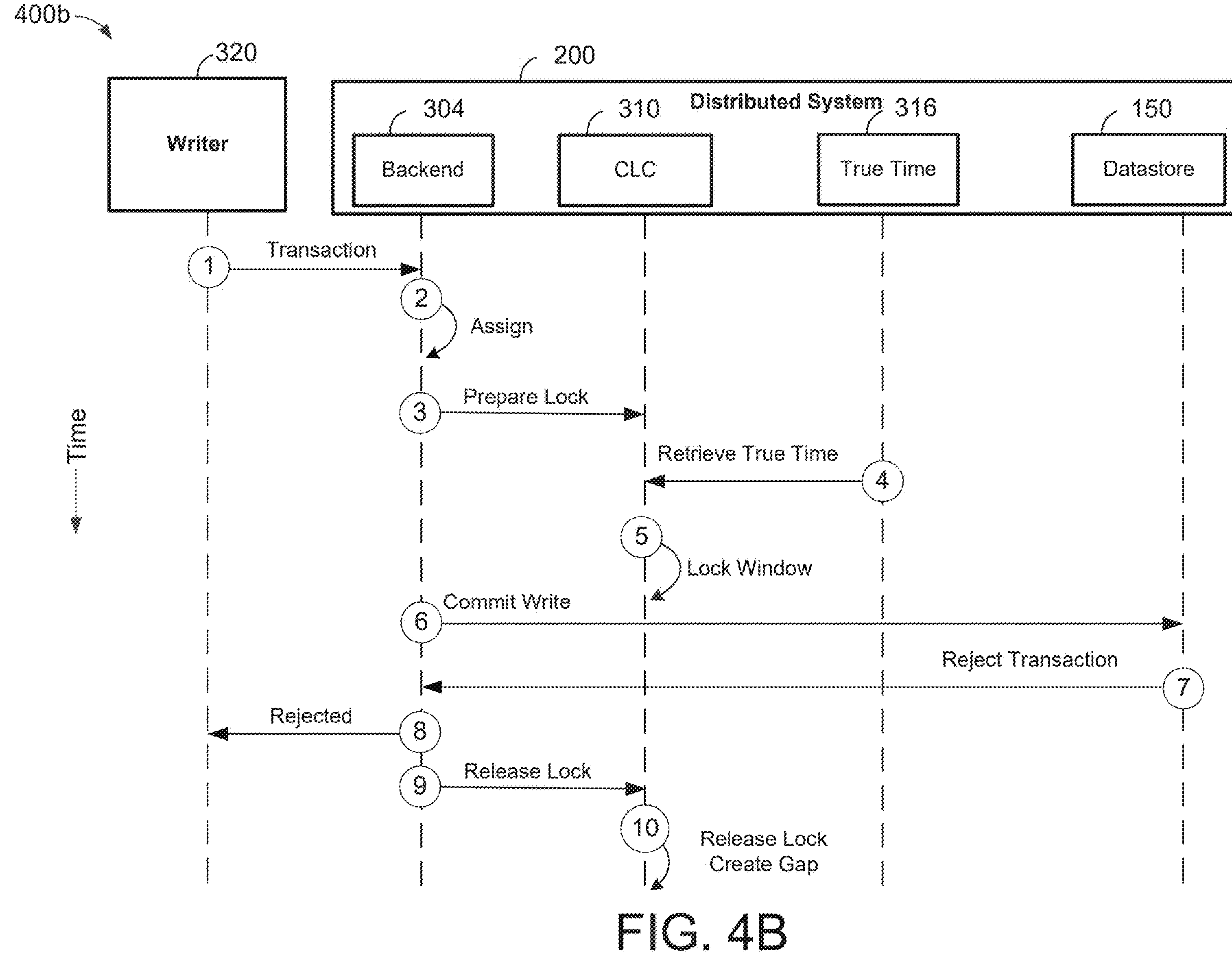

FIGS. 4A and 4B provide diagrams 400*a*, 400*b* illustrating example operations performed by the backend 304 and at least one change log cache 310 of the distributed system 200. The diagrams 400*a*, 400*b* may be described with reference to the notification system 300 of FIG. 3. The vertical y-axis indicates time increasing from the top to the bottom. At time 1, the backend 304 receives a transaction request (e.g., write access request 128) from a remote writer 320. The remote writer 320 may transmit the transaction request 138 to execute a write transaction 204 to mutate data 202 stored in the datastore 150 on the memory hardware 114. At time 2, the backend 304 assigns the corresponding transaction 204 as pending. Here, the backend 304 obtains the TT from the true time clock 316 and determines a $TD_{Max}$ for the corresponding transaction 204. The backend 304 may create a prepare lock message 330 that includes the $TD_{Max}$.

At time 3, the backend 304 sends the prepare lock message 330 to the CLC 310, and at time 4, the CLC 310 retrieves the TT from the true time clock 316 in response to receiving the prepare lock message 330. At time 5, the CLC 310 sets a notification lock during a commit time window 610 between the TT at the time the prepare lock message 330 is called (e.g., at time 3) and the $TD_{Max}$ for the corresponding transaction 204. The notification lock prevents the CLC 310 from notifying one or more watchers 322 for any completed transactions 204 having corresponding that fall within the commit time window 610. Subsequently, at time 6, the backend 304 commits execution of the corresponding transaction 204 to change (e.g., mutate) the data 202 within the datastore 150

At time 7, the datastore 150 returns a commit time to the backend 304 and the backend 304 obtains a transaction result 332 based on the returned commit time. FIG. 4A shows the commit time returned at time 7 occurring at or before the $TD_{Max}$ to provide a transaction result 332 indicating the corresponding transaction 204 is accepted. In this scenario, at time 8, the backend 304 notifies the writer 320 the transaction 204 is accepted, and at time 9, provides at least one mutation of the data 202 resulting from the corresponding transaction 204 to the CLC 310. At time 10, the CLC releases/removes the notification lock and records the at least one mutation of the data 202. By notifying the writer 320 the transaction 204 is accepted at time 8, the writer 320 is informed about the successful write transaction 204 before the writer 320 could view the result of the transaction 204 as a subscribing watcher 322. In other scenarios, however, the backend 304 may notify the writer 320 the transaction is accepted at time 10 when the CLC records the at least one mutation of the data 202 at time 10. In these scenarios, the at least one mutation of the data 202 is guaranteed to be recorded before the writer's 320 call is returned.

On the other hand, FIG. 4B shows the scenario where the corresponding transaction 204 is rejected due to the corresponding transaction 204 failing to complete/commit by the $TD_{Max}$ or the transaction 204 officially aborting before the $TD_{Max}$. For example, at time 7, the datastore 150 may return a transaction result 332 to the backend 304 indicating that the transaction 204 is rejected for failing to commit by the $TD_{Max}$ or indicating that the transaction 204 is rejected for officially aborting before the $TD_{Max}$. At time 8, the backend 304 notifies the remote writer 320 that the transaction 204 is rejected, and at time 9, the backend 304 sends a release lock message 334 to the CLC 314. Here, the release lock message 334 includes the transaction result 332 indicating that the corresponding transaction 204 has been rejected and informs the CLC 310 to release the notification lock. At time 10, the CLC 310 releases the notification lock previously set during the commit time window 610 and creates a gap associated with the corresponding transaction 204 that was rejected. More specifically, the CLC 310 may create the gap in the transaction history 312 during the commit time window 610, i.e., between the TT at the time the prepare lock message 330 is called (e.g., time 3) and the $TD_{Max}$ for the corresponding transaction 204. Accordingly, the gap created by the CLC 310 indicates that a transaction 204 was pending during the gap but the outcome of whether or not the transaction 204 completed is unknown.

Figure 5:
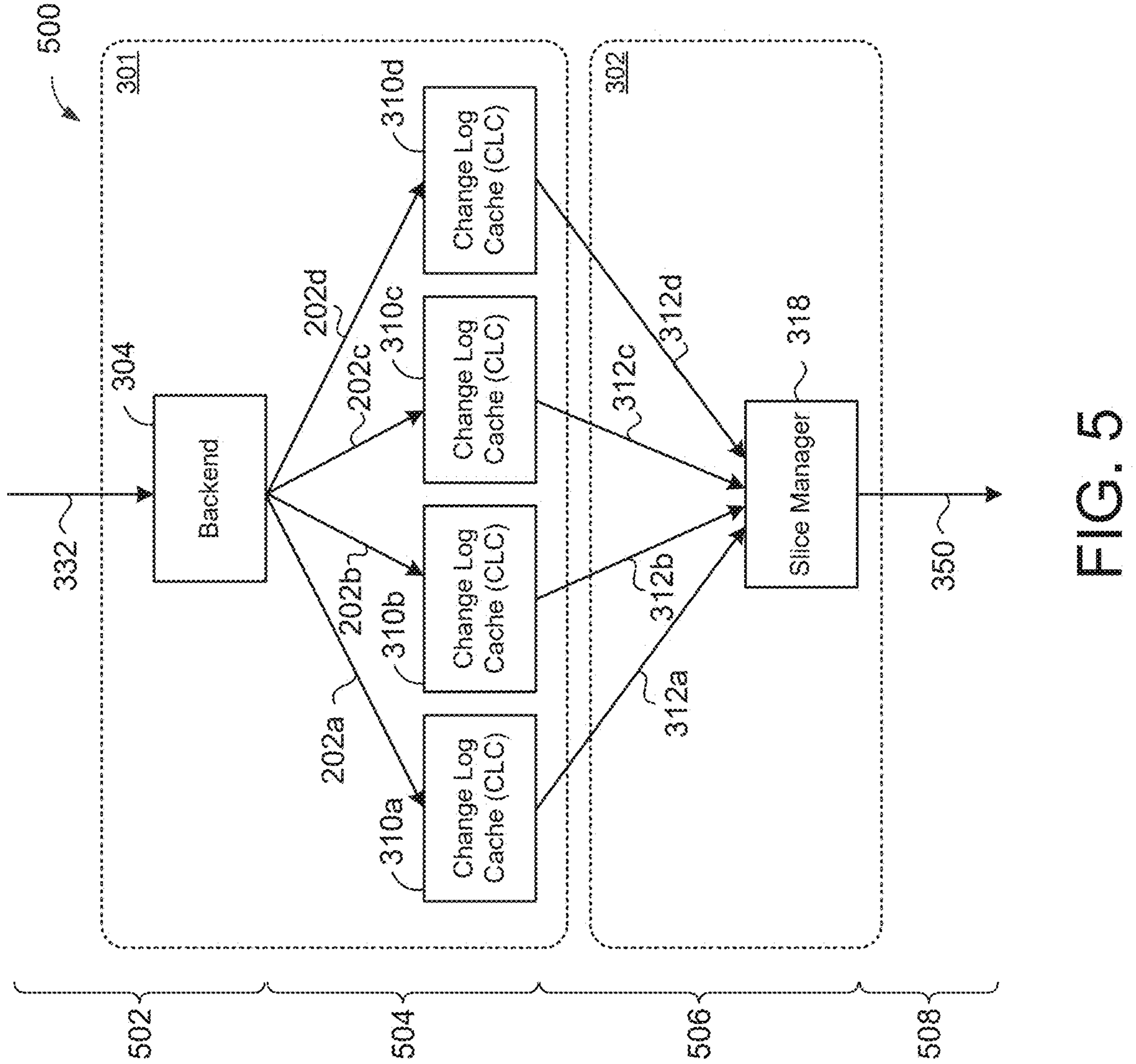
FIG. 5 is a schematic view of an example change log process.

FIG. 5 provides an example change log process 500 executing on the distributed system 200 to provide scalability based upon a current change log load (e.g., demand) on the distributed system 200. The change log process 500 can be described with reference to the notification system 300 of FIG. 3. The data processing hardware (e.g., computing device 112) executes an initial instance of the change log process 500 to provide an initial non-durable CLC 310*a* configured to store, on the memory hardware 114 in communication with the data processing hardware, a transaction history 312 of transactions (e.g., write transactions 204) executed on the distributed system 200. Accordingly, each CLC 310 (e.g., each instance of the change log process 500) is responsible for maintaining a cache of an ordered change log.

During the fan-in stage 301, the backend 304 sends a prepare lock message 330 to the CLC 310*a* in response to receiving a transaction request 128 (e.g., write access request) from a remote writer 320 for executing a corresponding transaction 204. Here, the CLC 310*a* processes each prepare lock message 330 by recording an entry for the corresponding transaction 204 yet to commit in the transaction history 312 (e.g., change log), which is guaranteed to commit by the $TD_{Max}$. When the backend 304 receives multiple transaction requests 128, the change log load upon the CLC 310*a* increases due to the CLC 310*a* having to process multiple prepare lock messages 330. In some examples, the datastore 150 is able to process more commits per second than the number of prepare lock messages 330 each CLC 310 is able to process concurrently before experiencing a loss in throughput. For instance, the CLC 310*a* may be able to process 10,000 incoming prepare lock messages 330 per second before caching performance degrades while the datastore 150 is capable of processing 300,000 commits per second. Accordingly, the CLC 310*a* may lack the throughput to handle the processing of incoming prepare log messages 330 when the change log load satisfies (e.g., exceeds) a threshold load. As a result, incoming prepare lock messages 330 may bottleneck while waiting for processing at the corresponding CLC 310. Here, the threshold load corresponds to a maximum number of prepare lock messages 330 per second the CLC 310*a* is able to process without experiencing a degradation in caching performance. The data processing hardware may determine the change log load based on the number of received transaction requests (e.g., write access requests 128) at a given time.

At operation 502, the backend 304 obtains transaction results 332 from the datastore 150 that includes mutated data 202 when corresponding transactions 204 successfully execute. As set forth above, the CLC 310*a* may not be able to record all of the changes occurring at the datastore 150 when the change log load satisfies the threshold load. To provide scalability for the caching of the transaction history 312 in the memory hardware 114 when the change log load satisfies the threshold load, the data processing hardware, at operation 504, splits the mutated data 202 from the transaction results 332 into multiple slices 202*a-d* and executes at least one subsequent instance of the change log process 500, which provides at least one subsequent non-durable CLC 310*b-d* for storing the slices 202*a-d* of the mutated data 202. As with the initial CLC 310*a*, each subsequent CLC 310*a-d* is configured to store a corresponding transaction history 312 of transactions executed on the distributed system 200. For example, FIG. 5 shows the data processing hardware executing three subsequent instances of the change log process 500 at operation 504 to provide multiple CLCs 310*a*, 310*b*, 310*c*, 310*d*. The data processing hardware may implement a "Slicer" component to monitor the change log load and decide to split the mutated data 202 into the multiple slices 202*a-d* due to overloading.

During the fan-out stage 302, each CLC 310*a-d*, e.g., each instance of the change log process 500 executing on the distributed system 200, may provide a corresponding transaction history 312*a*, 312*b*, 312*c*, 312*d* to the slice manager 318 executing on the distributed system 200. Here, each transaction history 312*a-d* indicates one or more slices 202*a-d* of the mutated data 202 for a corresponding transaction 204 that was accepted.

At operation 506, when multiple instances of the change log process (e.g., multiple CLCs 310*a-d*) are executing, the slice manager 318 ceases execution of at least one subsequent instance of the change log process 500 and merges the slices 202*a-d* of the mutated data 202 included in the transaction history 312 of the initial instance (e.g., CLC 310*a*) of the change log process 500 and the transaction history 312 of the at least one subsequent instance (e.g., CLCs 310*b-d*) of the change log process 500. As set forth above, the data processing hardware may implement the "Slicer" component to decide to merge the slices 202*a-d* of the mutated data 202 due to underloading of the change log load. For instance, FIG. 5 shows the transaction histories 312*a-d* from the multiple CLCs 310*a-d* fanning out into the slice manager 318 that merges the data slices 202*a-d* from the transaction histories 312 of the multiple CLCs 310*a-d* to provide the subscribing watchers 322 with a consistent snapshot of the transaction history 312 at a given instance in time. Here, the consistent snapshot of the transaction history 312 may provide one or more batches of mutated data 202 for corresponding transactions 204 that are accepted and/or one or more batches of gaps in the transaction history 312 for corresponding transactions 204 that are rejected. At operation 508, the one or more watcher proxies 314 transmit a notification 350 to each subscribing watcher 322 that includes the consistent snapshot of the transaction history 312 at the given instance in time. In the case of a gap in the transaction history, the watcher proxies 314 provide a cache miss to the corresponding remote watchers 322. The watcher proxies 314 may determine whether multiple instances of the change log process 500 are executing during the fan-out stage 302.

In some implementations, the one or more watcher proxies 314 provide resume tokens to the watchers 322 with every batch of mutated data 202 included in the consistent snapshot of the transaction history 312 at the given instance in time. The resume tokens are globally valid among all tasks and long lived such that the resume tokens may be used in the future. The resume tokens may contain ranges and associated timestamps that represent a current state of changes sent to the client. Accordingly, the use of the resume tokens may provide the ability for the watchers 322 to temporarily disconnect from the distributed system, and upon reconnecting, efficiently receive notifications 350 from the watcher proxies 314 even though the distributed system 200 has lost all state of the watchers 322 that temporarily disconnected.

FIG. 6 shows a plot 600 of the change log process 500 executing by the data processing hardware (e.g., computing device 112) on the distributed system 200 for updating the transaction history 312 stored in at least one CLC 310 each time a new write transaction 204 commits to update data 202 within the datastore 150. The horizontal x-axis shows true time of the distributed system 200 with global sequence numbers for the true time increasing from left to right. Dashed vertical lines 601-607 indicate respective global sequence numbers during the true time.

A first commit time window 610*a* is set by a corresponding CLC 310 between dashed vertical lines 601 and 603 for execution of a corresponding first transaction 204*a* on the distributed system 200. Here, the first commit time window 610*a* is associated with a first maximum commit time $TC_{Max\_1}$ guaranteeing the first transaction 204*a* will not commit after the $TC_{Max\_1}$. FIG. 6 shows the $TC_{Max\_1}$ bounding the first commit window 610*a* when the true time is equal to 13 at dashed vertical line 603 and the data processing hardware committing the first transaction 204*a* when the true time is equal to 4 at dashed vertical line 601.

Similarly, a second commit time window 610*b* is set by a corresponding CLC 310 between dashed vertical lines 602 and 604 for execution of a corresponding second transaction 204*b* on the distributed system 200. Here, the second commit time window 610*b* is associated with a second maximum commit time $TC_{Max\_2}$ guaranteeing the second transaction 2046 will not commit after the $TC_{Max\_2}$. FIG. 6 shows the $TC_{Max\_2}$ bounding the second commit time window 610*b* when the true time is equal to 21 at dashed vertical line 604 and the data processing hardware committing the second transaction 204*b* when the true time is equal to 12 at dashed vertical line 602. The CLCs 310 associated with the first and second commit time windows 610*a*, 610*b* may be the same or different.

Execution of the first transaction 204*a* completes with a commit time earlier than the first $TC_{Max\_1}$. For example, FIG. 6 shows the commit time for the first transaction 204*a* equal to 9 while the first $TC_{Max\_1}$ is equal to 13. Since the first transaction 204*a* is not locked-out by another pending transaction 204 having an earlier prepare lock time, the data processing hardware may immediately take a first consistent snapshot of the transaction history 312 upon receiving the commit time when the true time is equal to 9. While the second transaction 204*b* commits executing at dashed vertical line 602 before the first consistent snapshot of the transaction history 312, the second transaction 204*b* does not fully complete until after the first consistent snapshot. For example, the second transaction 204*b* includes a commit time equal to 18. Accordingly, the first consistent snapshot includes any mutations associated with the first transaction 204*a*, but not the second transaction 204*b*.

As FIG. 6 also shows the second transaction 204*b* including a corresponding commit time earlier than the second $TC_{Max\_2}$, the data processing hardware takes a second consistent snapshot of the transaction history 312 at the corresponding commit time equal to 18 since the second transaction 204*b* is not locked-out by another pending transaction 204 having an earlier prepare lock time. Here, the second consistent snapshot merges the transaction histories associated with both the commit time windows 610*a*, 610*b* to include mutations associated with both the first and second transactions 204*a*, 204*b*. The data processing hardware may execute at least one watcher proxy 314 to provide the merging of the transaction histories within the second consistent snapshot.

In some implementations, the data processing hardware determines a restart of the change log process 500 after an offline event 650. For example, FIG. 6 shows an off-line event 650 occurring at dashed vertical line 605 until the change log process 500 subsequently restarts at dashed vertical line 606 when the true time is equal to 30. Since change log caches do not have a durable state, any states previously held by change log caches before the offline event 650 are gone by time the change log process 500 restarts. In some examples, the data processing hardware relies on a global max commit time delay $TCD_{Max}$ to ensure that all transactions 204 executing on the distributed system 200 complete so that all subsequent snapshots of the transaction history 312 after the restart of the change log process 500 are consistent. To put another way, the $TCD_{Max}$ is a period of time that guarantees that any transactions 204 committing before the restart of the change log process 500 will complete by the end of the $TCD_{Max}$. The data processing hardware determines a current sequence number based on the true time when the change log process restarts. For instance, the current sequence number is equal to 30 at dashed vertical line 606 when the change log process 500 restarts. Thereafter, the data processing hardware waits the $TCD_{Max}$ from the current sequence number (e.g., dashed vertical line 606) before updating the transaction history 312 of transactions 204 executed on the distributed system. As used herein, the true time (TT) effectively discretizes time such that a measurement of true time on a given system corresponds to actual time. Accordingly, the TT defines an interval that indicates a current time is probabilistically within an interval between a lower bound of TT (TTnow_lowerbound) and an upper bound of TT (TTnow_upperbound). As a result, values of TT cannot be directly prepared and a condition for an event at a second true time (TT2) to have occurred after a first true time (TT1) is TT2_lowerbound is greater than TT1_upperbound. FIG. 6 shows the $TCD_{Max}$ equal to 20 and occurring between dashed vertical lines 606 and 607. Accordingly, when the $TCD_{Max}$ is equal to 20, the data processing hardware does not update the transaction history 312 until dashed vertical line 607 when the true time is equal to 50.

In some examples, a third commit time window 610*c* is set by a corresponding CLC 310 when the true time is equal to 25 and the offline event 650 occurs during the third commit time window 610*c*. While the third commit time window 610*c* expires at a third $TC_{Max\_3}$ known before the occurrence of the offline event 650, the corresponding CLC 310 loses the state of the corresponding transaction 204 associated with the third commit time window 610*c* as a result of the offline event 650 between dashed vertical lines 605 and 606. Accordingly, during the change log process 500, the watcher proxy 314 waits the $TCD_{Max}$ to provide a consistent snapshot of the transaction history 312 that includes the corresponding transaction 204 associated with the third commit time window 610*c*. In the case of gaps in the transaction history 312, the watcher proxy 314 retrieves the consistent state from the datastore during the time range of the gap.

In some implementations, a fourth commit time window 610*d* is set by a corresponding CLC 310 after the restart event and includes a fourth $TC_{Max\_4}$ occurring before the end of the $TCD_{Max}$. Assuming the corresponding transaction associated with the fourth commit time window 610*d* successfully commits by the fourth $TC_{Max\_4}$, the consistent snapshot of the transaction history 312 at the end of the $TCD_{Max}$ merges the transaction histories associated with both the commit time windows 610*c*, 610*d* to include mutations associated with the their corresponding transactions 204. By contrast, a corresponding transaction 204 associated with a fifth commit time window 610*e* that commences during the $TCD_{Max}$, but expires after the $TCD_{Max}$, will not be included in the consistent snapshot at the end of the $TCD_{Max}$ because a fifth $TC_{Max\_5}$ associated with the fifth commit time window 610*d* occurs after the $TCD_{Max}$.

Figure 7:
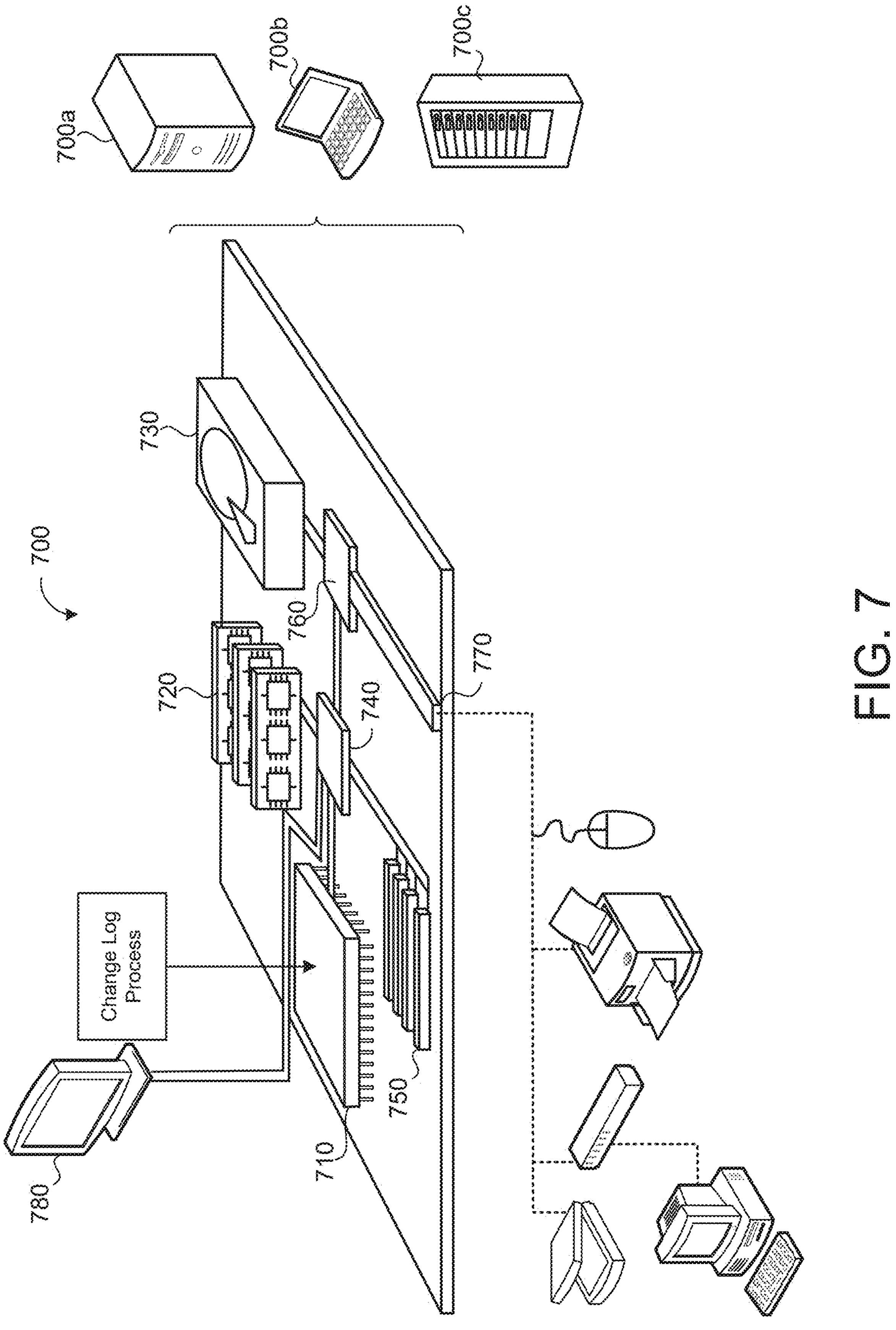
FIG. 7 is a schematic view of an example computing device in communication with memory hardware.

FIG. 7 is a schematic view of an example computing device 700 that may be used to implement the systems and methods described in this document, such as the computing resource 112 and the datastore 150. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 700 includes a processor 710 (i.e., data processing hardware), memory 720, a storage device 730, a high-speed interface/controller 740 connecting to the memory 720 and high-speed expansion ports 750, and a low speed interface/controller 660 connecting to a low speed bus 770 and storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a GUI on an external input/output device, such as a display 780 coupled to a high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 730 is capable of providing mass storage for the computing device 700. In some implementations, the storage device 730 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and low-speed expansion port 670. The low-speed expansion port 770, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

In some implementations, the computing device 700 implementing the computing resource(s) 112 is in communication with datastore 150 (e.g., in the memory 720). The computing resource 112 (executing on the data processing hardware 710) executes an initial instance 310 of a change log process 500 for the distributed system 200, each instance 310 of the change log process 500 configured to store, on the memory hardware 720 in communication with the computing resource 112, the transaction history 312 of transactions 204 (e.g., write transactions) executed on the distributed system 200. The computing resource 112 may receive transaction requests 138 and determine a change log load based on the received transaction requests 138. In some examples, the computing resource 112 executes at least one subsequent instance 310 of the change log process 500 when the change log load satisfied the threshold load and determines whether multiple instances of the change log process 500 are executing. When multiple instances of the change log process 500 are executing, the computing resource 112 may cease execution of the at least one subsequent instance of the change log process 500 and merge the transaction history of the initial instance 310 of the change log process 500 and the transaction history of the at least one subsequent instance 310 of the change log process 500. In some examples, the computing resource 112 provides a consistent snapshot reflecting the merged transaction histories to all subscribing watchers 322 of the mutated data.

A software application (i.e., a software resource 110*s*) may refer to computer software that causes a computing device to perform a task. In some examples, a software application may be referred to as an “application,” an “app,” or a “program.” Example applications include, but are not limited to, system diagnostic applications, system management applications, system maintenance applications, word processing applications, spreadsheet applications, messaging applications, media streaming applications, social networking applications, and gaming applications.

The non-transitory memory 110*hm* may be physical devices used to store programs (e.g., sequences of instructions) or data (e.g., program state information) on a temporary or permanent basis for use by a computing device 110*hc*. The non-transitory memory 110*hm* may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A computer-implemented method executed by data processing hardware that causes the data processing hardware to perform operations comprising:

- executing a plurality of instances of a change log process for a distributed system, each instance of the change log process configured to store a respective transaction history of transactions executed on the distributed system;
- receiving transaction requests for executing corresponding transactions on the distributed system;
- determining a change log load based on a number of received transaction requests;
- allocating the transaction requests to the plurality of instances of the change log process based on the change log load; and
- merging the respective transaction history of each of the plurality of instances of the change log process.

2. The method of claim 1, wherein the operations further comprise determining that the change log load satisfies a degradation threshold.

3. The method of claim 2, wherein the degradation threshold indicating a state where the change log load degrades caching performance.

4. The method of claim 2, wherein the transaction load exceeds the degradation threshold.

5. The method of claim 2, wherein the operations further comprise ceasing execution of at least one of the plurality of instances based on determining that the change log load satisfies the degradation threshold.

6. The method of claim 1, wherein the operations further comprise receiving a request from a user device to monitor data events for data within the distributed system.

7. The method of claim 6, wherein the request requests a notification for the data event.

8. The method of claim 7, wherein the notification is configured to cause the user device to display the notification executing on the user device.

9. The method of claim 8, wherein the notification is displayed on a graphical user interface (GUI) of the user device.

10. The method of claim 6, wherein the request corresponds to a standing query to retrieve information related to the data events occurring at the distributed system.

11. A system comprising:

- data processing hardware of a distributed system; and
- memory hardware in communication with the data processing hardware, the memory hardware storing instructions that when executed on the data processing hardware cause the data processing hardware to perform operations comprising:
  - executing a plurality of instances of a change log process for the distributed system, each instance of the change log process configured to store a respective transaction history of transactions executed on the distributed system;
  - receiving transaction requests for executing corresponding transactions on the distributed system;
  - determining a change log load based on a number of received transaction requests;
  - allocating the transaction requests to the plurality of instances of the change log process based on the change log load; and
  - merging the respective transaction history of each of the plurality of instances of the change log process.

12. The system of claim 11, wherein the operations further comprise determining that the change log load satisfies a degradation threshold.

13. The system of claim 12, wherein the degradation threshold indicating a state where the change log load degrades caching performance.

14. The system of claim 12, wherein the transaction load exceeds the degradation threshold.

15. The system of claim 12, wherein the operations further comprise ceasing execution of at least one of the plurality of instances based on determining that the change log load satisfies the degradation threshold.

16. The system of claim 11, wherein the operations further comprise receiving a request from a user device to monitor data events for data within the distributed system.

17. The system of claim 16, wherein the request requests a notification for the data event.

18. The system of claim 17, wherein the notification is configured to cause the user device to display the notification executing on the user device.

19. The system of claim 18, wherein the notification is displayed on a graphical user interface (GUI) of the user device.

20. The system of claim 16, wherein the request corresponds to a standing query to retrieve information related to the data events occurring at the distributed system.

* * * * *